Dec. 17, 1968 H. TIMM 3,417,388
BINARY MAGNETIC REPRODUCING CIRCUITRY
Filed Nov. 8, 1965
2 Sheets-Sheet 1

INVENTOR
Heinz TIMM

Dec. 17, 1968 H. TIMM 3,417,388

BINARY MAGNETIC REPRODUCING CIRCUITRY

Filed Nov. 8, 1965

2 Sheets-Sheet 2

INVENTOR

Heinz TIMM

United States Patent Office 3,417,388

Patented Dec. 17, 1968

3,417,388

BINARY MAGNETIC REPRODUCING CIRCUITRY

Heinz Timm, Regensburg, Germany, assignor to Diehl, Nuremberg, Germany

Filed Nov. 8, 1965, Ser. No. 506,638
Claims priority, application Germany, Nov. 14, 1964, D 45,855
5 Claims. (Cl. 340—174.1)

ABSTRACT OF THE DISCLOSURE

Arrangement for reading a magnetic storage member having information binarily coded thereon in bit periods in the form of "0" and "1" values in the form of alternating pulses of respective duration and in which the read values are rectified and are employed to charge capacitors, one of which is fully charged during each bit period and the other of which is fully charged only when a "1" value is recorded in the respective bit period, together with a time control element in the form of a monostable multivibrator which is triggered by the charge on the one capacitor and which is effective for discharging both capacitors while supplying information to a succeeding processing station only if a "1" value has been stored in said other capacitor.

With customary magnetizable information storage means, such as magnetized tapes or drums, the recording of binarily coded information is effected by imposing direct current impulses containing the respective information onto a writing head. During this operation, discrete surface elements of the information storage means movable past said writing head in slidably spaced relationship thereto are magnetized with each writing impulse, which means with each binary "1" up to saturation, whereas the binary "0" is characterized by the lack of a writing current impulse. The magnetization of the surface elements remains maintained, and the recorded information can be read on a reading head by moving the information storage means past the same. Each magnetized surface element which represents a magnetized dipole induces in the reading head a voltage impulse which is conveyed through a reading amplifier to the calculator for further processing.

Particularly magnetic tapes are frequently soiled by dust particles, or the magnetizable layer has recesses or the like. If such a defective area passes by the reading head, the reading impulse is temporarily interrupted which means it is subdivided into two shorter impulses so that the information will be falsified. Therefore, in such an instance a true reproduction of the information is not always assured.

It is an object of the present invention to provide a method of and circuit for recording and reproducing binarily coded information on or from a magnetizable information storage means, such as a magnetic tape or drum storage means in which the binary value "1" and the binary value "0" will be differentiated by the presence or the absence of a voltage of a certain constant amplitude, which will overcome the above mentioned drawbacks.

It is another object of this invention to provide a method and circuit as set forth above, which is simple and reliable in operation.

These and other objects and advantages of the invention will appear more clearly from the following specification in connection with the accompanying drawings, in which.

Figures 1, 2, 3:
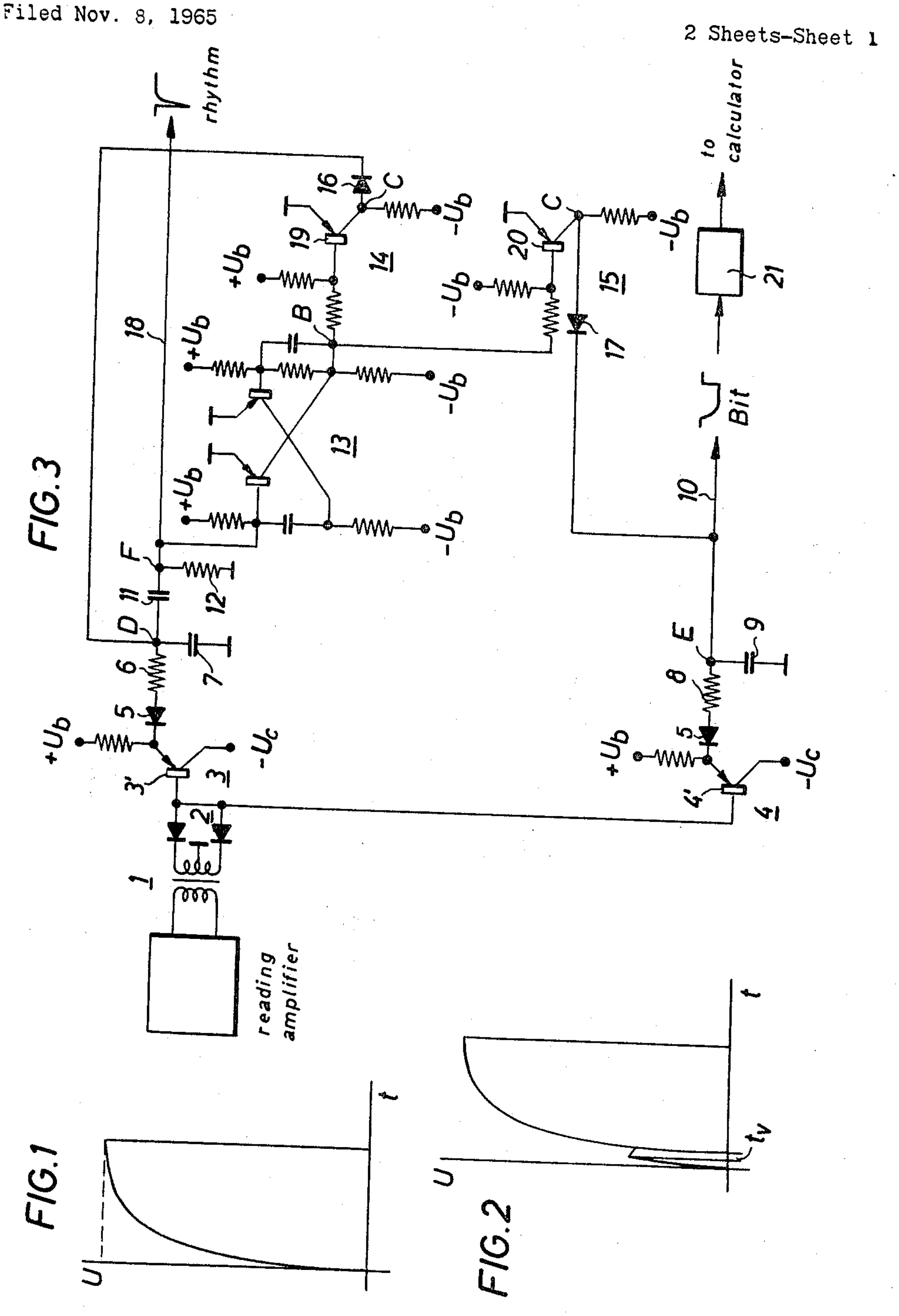
FIG. 1 illustrates the course of the voltage applied to the capacitive storage means of information recorded and read in conformity with the method of the present invention.
FIG. 2 shows the course of the condenser voltage during the passage of a defective area.
FIG. 3 represents a circuit for carrying out the method of the present invention for purposes of reproducing binarily coded information.

FIGS. 4*a* to 4*f* respectively show the course of the voltage at various points of the circuit of FIG. 3.

According to the present invention it is suggested for purposes of recording and reproducing information to employ alternating voltage impulses of a frequency and length selected in conformity with the speed of the tape or drum, which impulses during the reading of the information charge capacitive storage means while the information voltage applied to the storage means is conveyed to the calculator through impulse forming control members. The impulse length is selected relatively large with regard to the length of the defective area to be expected so that the charging process will be interrupted only briefly when a defective area is being passed by. Inasmuch as the charging voltage applied to a capacitance asymptotically approaches its maximum value, it will nevertheless approach said maximum value in this instance very closely so that also in the presence of a defective area a reading of the recorded information will be assured with sufficient safety.

According to a further development of the present invention, for purposes of obtaining a rhythm impulse sequence, the binary "1" and the binary "0" will be represented by alternating voltage impulses of different duration while one rhythm control member will from each value impulse form a rhyhm impulse, whereas an information conrol member will convert the information into an impulse form suitable for processing in a calculator. This method is applicable with great advantage particularly when a pure series storage on the information storage means is provided. In this instance it is known for purposes of producing rhythm impulses by means of which the calculator is synchronized with the tape, to provide a free oscillating rhythm generator the frequency of which as far as possible approaches the rhythm frequency, i.e. the bit frequency of the recorded information. The rhythm generator is synchronized by each "1"-impulse. Inasmuch as with the method according to the present invention a recorded "1" as well as a recorded "0" furnishes a rhythm impulse, the rhythm generator may be discarded.

According to the present invention, the binary "1" is recorded for instance upon a magnetic tape storage means by means of an alternating voltage impulse of suitable frequency and length, whereas in the value areas where the binary "0" is recorded, the alternating voltage impulse of shorter duration prevails or is entirely absent. When reading the information, the alternating current furnished by a reading amplifier is first rectified and then conveyed to a condenser which is fully charged with each "1"-impulse. The course of the voltage applied to the condenser is shown in FIG. 1. A suitable control step discharges the condenser with each bit end. The voltage applied to the condenser controls a sweep step the information of which is conveyed to the calculator.

If the magnetic tape section storing the "1"-information comprises a defective area, for instance a dust particle, the tape will with suitably selected bit length be lifted from the reading head for a period of time which is rather short with regard to the bit length, so that the charging operation will be interrupted. The remaining oscillations will, however, still suffice to charge the condenser to such an extent that an unequivocal discrimination of the binary "1" and the binary "0" will be possible.

The course of the charging voltage obtained under these circumstances is illustrated in FIG. 2. During the time $t_v$, a defective area passes by the reading head while the condenser is being somewhat discharged. The subsequent oscillations are, however, able to recharge the condenser almost up to the maximum voltage indicated in FIG. 1 by dash lines.

Figures 4A, 4B, 4C, 4D, 4E, 4F:
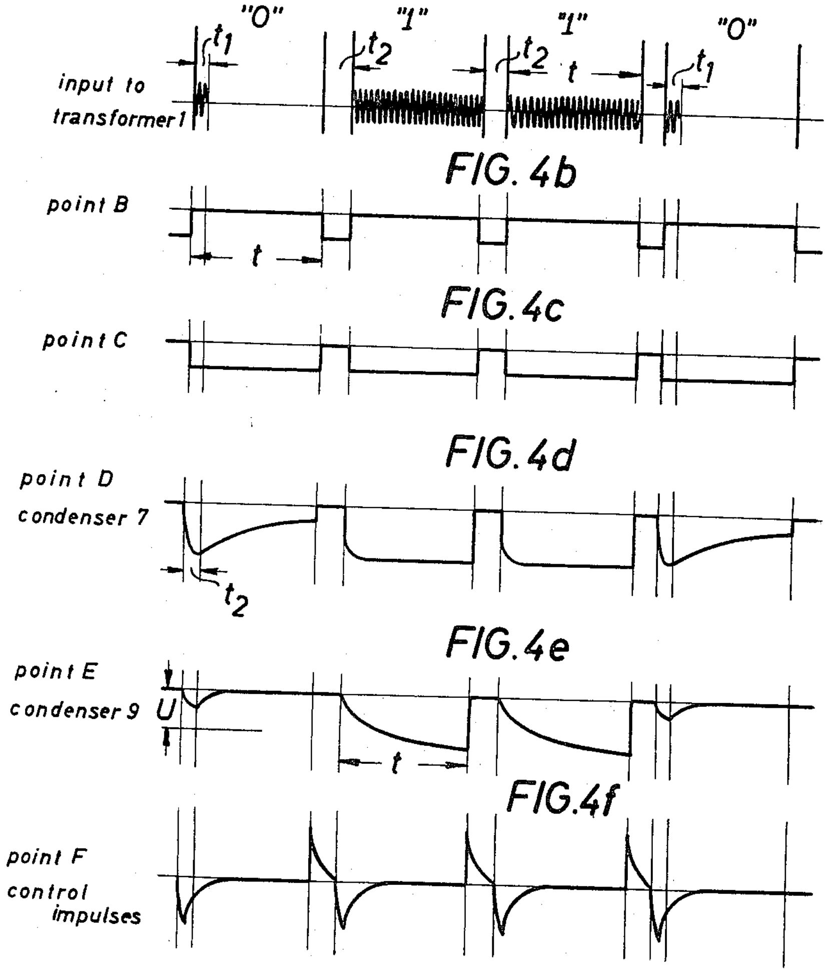

FIG. 4*a* shows the course as to time of an information voltage, according to which the "1" is represented by an alternating voltage impulse of a length equalling the bit length, whereas an alternating voltage impulse shorter than the bit length represents the "0." Such a representation of the "1" and "0" has the advantage that from the information voltage of each bit there can be obtained a rhythm impulse.

FIG. 3 illustrates a circuit for the selection of the sequence of rhythm and information impulses.

The outlet of the reading amplifier is connected to the primary winding of a transformer 1 the secondary winding of which forms a part of a full wave rectifier 2. The voltage furnished by the rectifier 2 controls two amplifier stages 3, 4 equipped with two transistors 3′ and 4′ the outlets of which stages are connected through decoupling diodes 5 with differently dimensioned R-C members 6, 7 and 8, 9 respectively. The voltage applied to condenser 9 represents the information and is available at a conductor 10 for further processing by the calculator.

Connected to condenser 7 is a differentiating member 11, 12 which is adapted from the charging voltage to form the rhythm impulse sequence which is conveyed to the calculator through a conductor 18. Also connected to the differentiating member 11, 12 is the inlet of an astable sweep control 13 the outlet of which has connected thereto two control stages 14, 15 equipped with transistors 19, 20. The outlets of transistors 19, 20 are through decoupling diodes 16, 17 connected to the covering of condensers 7, 9 which covering has a potential different from zero potential so that the condensers 7, 9 are discharged when the emitter collector sections of the transistors 19, 20 are conductive.

The operation of the circuit shown in FIG. 3 will now be explained in connection with FIGS. 4*a* to 4*f*.

The voltage furnished by the reading amplifier has the shape indicated by the curve of FIG. 4*a*. "$t$" represents the duration of a "1"-impulse and thus also the bit length. The "0"-impulse extends over the time $t_1$. The time period $t_2$ between the individual bits is so selected that the read information can within this time period be decoded and processed by the calculator. The voltage according to FIG. 4*a* is rectified in the rectifier 2 and controls transistors 3′ and 4′. The condensers 7, 9 become charged during the times during which the transistors 3′, 4′ pass the voltage, and said charging is effected through the intervention of diodes 5 and resistors 6, 8 while diodes 5 prevent a discharge of condensers 7, 9 when the transistors 3′, 4′ are blocked. The shape of the curve of the voltage applied to points D and E (FIG. 3) is illustrated in FIGS. 4*d* and 4*e*. In conformity with the selection of the time constants of the R-C members 6, 7 and 8, 9, the voltage applied to condenser 7 will with each impulse obtain its full magnitude while condenser 9 will with the impulses representing "0" be charged only partially.

The information impulse voltage according to FIG. 4*e* is conveyed to the calculator through conductor 10. A suitable threshold value component 21 responds to voltages above a lower limit value U and stores the binary information "1." If binary information "0" is present, the said member 21 will not respond.

By means of voltage impulses occurring at point D (FIG. 3), a further R-C member (impulse former stage) is charged which is arranged as differentiating member. The voltage occurring at point F thus has the shape of a curve illustrated in FIG. 4*f*. With each bit, there will occur two oppositely poled needle impulses which are conveyed to the calculator through conductor 18 for producing rhythms.

Each needle impulse of a predetermined polarity reverses the monostabile sweep control 13 which is so dimensioned that it sweeps back after the time $t$ (bit duration). The voltage at the outlet of the sweep stage 13 (point B) thus has the shape as illustrated in FIG. 4*b*. Sweep stage 13 controls the two control stages 14, 15. The transistors 19, 20 are opened when sweep stage 13 is not swept.

The potential of point C primarily takes the course illustrated in FIG. 4*c*. It is known that the transistors 19, 20 are conductive during the time periods $t_2$ whereby points D, E are connected to ground so that the condensers 7, 9 will be discharged as is indicated in FIGS. 4*d* and 4*e*.

It is, of course, to be understood that the present invention is, by no means, limited to the particular method and arrangement referred to above but also comprises any modifications within the scope of the appended claims.

What I claim is:

1. An arrangement for reading information which is binarily coded as "0" and "1" bits on a magnetic information storage element on which no rhythm track exists, and for conveying said information to an information processing system which, in addition to said information, also requires the rhythm, the said information consisting of "0" and "1" bits being recorded on the information storage element in the form of alternating voltage impulses of respectively different duration during a bit period, said bit periods being in spaced relation on said storage element, means for scanning said storage element delivering rectified voltage impulses to first and second impulse storing members, said first storing member being charged by each of said "0" and "1" bits, said second storing member being fully charged only by the "1" bits, and a time indicating control element which, in cooperation with said first storing member, forms a rhythm impulse for each bit period, and means for conveying said rhythm impulses and the charge on said second storing member due to a "1" bit to a succeeding information processing system while simultaneously discharging said storing members.

2. An arrangement according to claim 1 in which said first and second storing members are in the form of respective first and second capacitors, said first capacitor having a small capacity and said second capacitor having a large capacity, a charge resistor in series with each capacitor, said information processing system being sensitive to impulses above a predetermined voltage only, said second capacitor having such a charging constant as to charge to a level above said predetermined voltage during a "1" bit period even if the reading of the bit is interrupted for a brief time.

3. An arrangement according to claim 1, in which said time indicating control element is in the form of a monostable multivibrator, the time constant of which equals the duration of a "1" bit.

4. A circuit for reading binary information recorded on a magnetizable storage member in the form of alternating impulses disposed in bit periods of predetermined duration which are spaced by an interval of predetermined duration with information of one binary value appearing as a short period of alternating impulses at the beginning of the respective bit period and information of the other binary value appearing as a period of alternate impulses extending substantially throughout the respective bit period, comprising; means for traversing the storage member for reading the storage member and operable to develop alternating current impulses from the respective recorded binary values, rectifier means connected to receive said alternating current impulses and to rectify the said alternating current impulses so as to supply direct current impulses, a rhythm control capacitor and an information capacitor connected to receive said direct current impulses, a resistor in series with at least said information capacitor to control the charging rate of the information capacitor whereby the voltage developed thereon is dependent upon the duration of the direct current impulse developed by the binary value being read, control means under the control of said rhythm control capacitor operable to control a receiving station connected to receive values from said information capacitor, said control means being operable to discharge said rhythm control capacitor and said information capacitor at the end of each bit period, and a threshold component connected in series into said information capacitor and operable to pass values therefrom to the receiving station only when the voltage on said information capacitor exceeds a predetermined value.

5. A circuit according to claim 4 in which said control means comprises a monostable sweep circuit and two control stages connected to be controlled by the sweep circuit and also connected to respective ones of said capacitors to discharge the same when made conductive in one condition of said sweep circuit, said sweep circuit being triggered by the voltage on said rhythm capacitor at the beginning of a bit period into condition to block said control stage and having a sweep time equal to the duration of a bit period whereby at the end of each bit period said control stages are opened to discharge said capacitors and said receiving stage can process information received from said information capacitor in the time interval before the succeeding bit period.

References Cited

UNITED STATES PATENTS

| | | | |
|---|---|---|---|
| 3,353,164 | 11/1967 | Folsom | 340—173 |
| 3,314,062 | 4/1967 | Pommerening | 320—1 |
| 3,289,190 | 11/1966 | Guerth | 340—174.1 |
| 3,281,806 | 10/1966 | Lawrance et al. | 340—174.1 |

BERNARD KONICK, *Primary Examiner.*

A. I. NEUSTADT, *Assistant Examiner.*

U.S. Cl. X.R.

320—1